(12) United States Patent
Akasaka

(10) Patent No.: US 9,527,110 B2
(45) Date of Patent: Dec. 27, 2016

(54) ELECTRONIC APPARATUS

(71) Applicant: NIKON CORPORATION, Tokyo (JP)

(72) Inventor: Satoshi Akasaka, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 226 days.

(21) Appl. No.: 14/474,434

(22) Filed: Sep. 2, 2014

(65) Prior Publication Data

US 2015/0076931 A1    Mar. 19, 2015

Related U.S. Application Data

(63) Continuation of application No. PCT/JP2013/055807, filed on Mar. 4, 2013.

(30) Foreign Application Priority Data

Mar. 5, 2012 (JP) .................... 2012-048275

(51) Int. Cl.
*G08B 6/00* (2006.01)
*B06B 1/14* (2006.01)
*B06B 1/04* (2006.01)
*H04M 19/04* (2006.01)

(52) U.S. Cl.
CPC . *B06B 1/14* (2013.01); *B06B 1/04* (2013.01); *H04M 19/047* (2013.01)

(58) Field of Classification Search
CPC ............... B06B 1/04; B06B 1/14; G08B 6/00; H04M 19/047; H04M 1/02; H04M 1/21; G01B 7/012; G01B 7/002; G06F 3/016

USPC .............. 340/407.1, 573.1, 582; 310/19, 20; 702/33, 56, 113
See application file for complete search history.

(56) References Cited

U.S. PATENT DOCUMENTS 6,360,176 B1 * 3/2002 Nishioki ................ G01B 7/012
702/113
2007/0119232 A1 * 5/2007 Konno ................ G01N 29/036
73/24.01

FOREIGN PATENT DOCUMENTS

JP         2010-086089         4/2010

OTHER PUBLICATIONS

PCT International Search Report and Written Opinion of the International Searching Authority mailed May 28, 2013 in corresponding International Patent Application No. PCT/JP2013/055807.

* cited by examiner

*Primary Examiner* — Hung T Nguyen

(57) ABSTRACT

An electronic apparatus includes: a body unit that houses an electronic circuit; a vibration unit that is provided in the body unit, is configured to vibrate in a predetermined direction, and has a variable frequency of vibration; a plurality of resonators that are each provided in a different portion of the body unit and are each configured to resonate with vibration having a different frequency; and a transmission unit that is configured to transmit vibration of the vibration unit to the plurality of resonators.

8 Claims, 3 Drawing Sheets

ELECTRONIC APPARATUS

CROSS-REFERENCE TO RELATED APPLICATION

This is a Continuation application of International Application No. PCT/JP2013/55807 filed on Mar. 4, 2013, which claims priority on Japanese Patent Application No. 2012-48275 filed on Mar. 5, 2012. The contents of the aforementioned applications are incorporated herein by reference.

BACKGROUND

Field of the Invention

The present invention relates to an electronic apparatus.

Background

As an electronic apparatus such as a mobile phone or a portable information terminal, for example, an apparatus disclosed in Japanese Unexamined Patent Application Publication No. 2010-86089 is known. In an electronic apparatus disclosed in Japanese Unexamined Patent Application Publication No. 2010-86089, a configuration that allows a user to detect vibration may be used in some cases.

As a vibration generating apparatus that generates this type of vibration, for example, a vibration motor is known. As a vibration motor, for example, a configuration is known in which a weight is attached on the tip of a cylindrical rotator and vibration is generated by the rotation of a motor.

SUMMARY

However, it is difficult for a vibration motor of the related art to reproduce a broad range of vibration states.

An object of an aspect of the present invention is to provide an electronic apparatus capable of reproducing a broad range of vibration states.

According to a first aspect of the present invention, there is provided an electronic apparatus including: a body unit that houses an electronic circuit; a vibration unit that is provided in the body unit, is configured to vibrate in a predetermined direction, and has a variable frequency of vibration; a plurality of resonators that are each provided in a different portion of the body unit and are each configured to resonate with vibration having a different frequency; and a transmission unit that is configured to transmit vibration of the vibration unit to the plurality of resonators.

According to an aspect of the present invention, it is possible to provide an electronic apparatus capable of reproducing a broad range of vibration states.

DESCRIPTION OF THE EMBODIMENTS

Hereinafter, embodiments of the present invention will be described with reference to the drawings.

Figure 1:
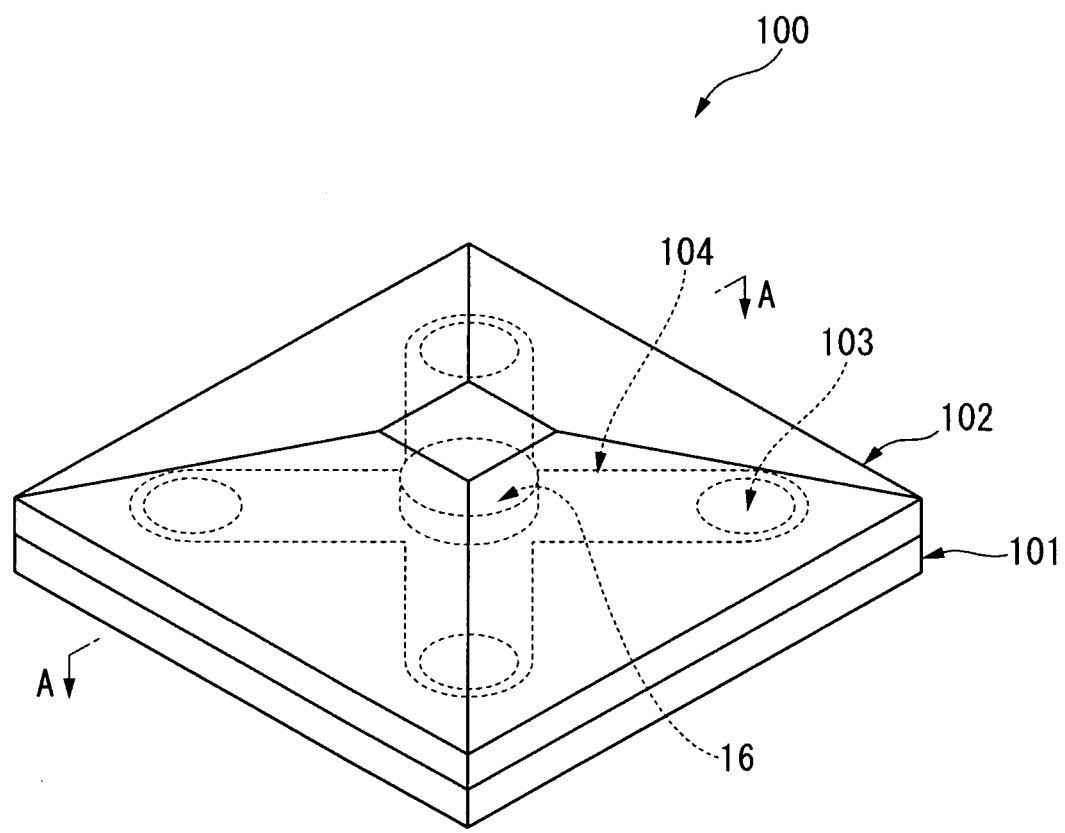
FIG. 1 is a perspective view showing a configuration of an electronic apparatus according to an embodiment of the present invention.

FIG. 1 is a perspective view showing a configuration of an electronic apparatus 100 according to an embodiment of the present invention.

As shown in FIG. 1, the electronic apparatus 100 includes a body unit 101 formed in a rectangular plate shape and a movable unit 102 connected to the body unit 101 via a vibration unit 16. In addition, the body 101 is provided with a plurality of resonators 103 and a transmission unit 104.

Figure 2:
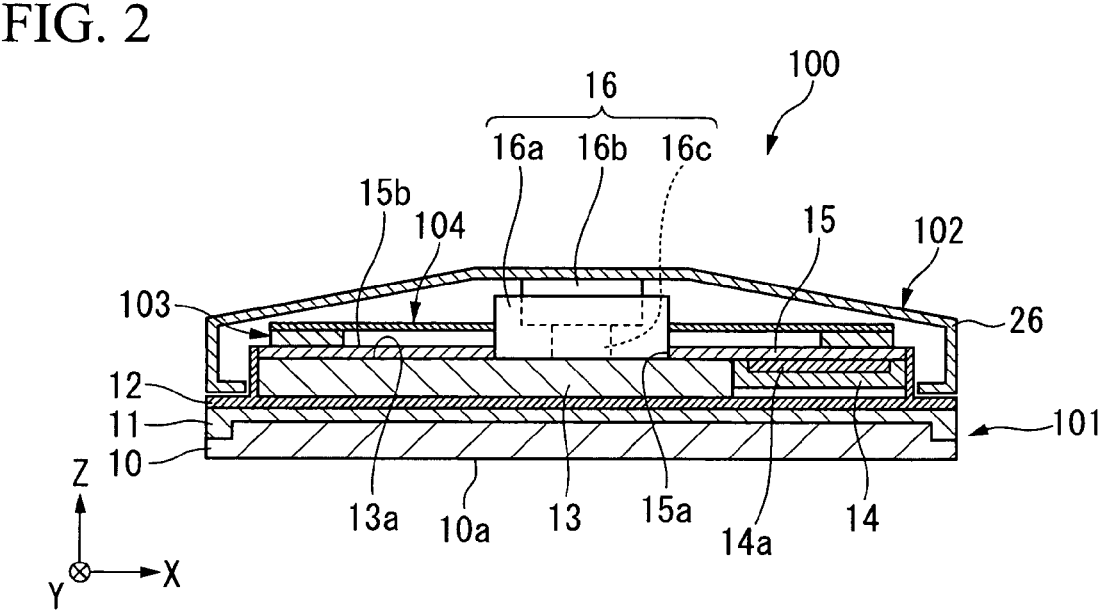
FIG. 2 is a view showing a configuration along an A-A cross section in FIG. 1.

FIG. 2 is a view showing a configuration along an A-A cross section in FIG. 1.

As shown in FIG. 2, the body unit 101 includes a display panel 10, a first base unit 11, a second base unit 12, a battery 13, a first substrate 14, a bottom cover 15, and the vibration unit 16. The body unit 101 is assembled in a state where these respective constituents are stacked.

Hereinafter, in the present embodiment, when describing a configuration of the electronic apparatus 100, an XYZ rectangular coordinate system is used. In the XYZ rectangular coordinate system, the stacking direction of respective constituents of the body unit 101 is defined as a Z-axis direction. A plane orthogonal to the Z-axis direction is defined as an XY plane. Orthogonal directions in the XY plane are defined as an X-axis direction and a Y-axis direction, respectively.

The display panel 10 is formed in a rectangular shape in a Z-axis direction view. The display panel 10 has a surface on the -Z side as a display surface 10a. The display surface 10a displays an image such as a still image or a moving image. As the display panel 10, for example, a liquid crystal display panel, an organic EL panel, or the like is used. A configuration may be adopted in which a touch panel mechanism (not illustrated) is provided on the display surface 10a of the display panel 10.

The first base unit 11 holds the display panel 10. The first base unit 11 is formed in a rectangular frame shape in a Z-axis direction view. The first base unit 11 is formed so as to surround a side portion of the display panel 10 and a peripheral portion of the display surface 10a. A second base unit 12 is disposed on the +Z side of the first base unit 11. Part of the second base unit 12 is supported by the first base unit 11.

The battery 13 has an external form formed in a rectangular plate shape. The battery 13 supplies electric power to respective units of the electronic apparatus 100. The battery 13 is connected to respective units of the electronic apparatus 100 via a wiring (not shown). A surface 13a on the +Z side of the battery 13 is formed to be flat.

The first substrate 14 is disposed so as to provide a space in which the battery 13 is disposed. The first substrate 14 is supported by the second base unit 12. A control circuit 14a is formed in the first substrate 14. The electronic apparatus 100 is configured such that respective units are electrically controlled by the control circuit 14a.

The bottom cover 15 is formed in a rectangular plate shape. The bottom cover 15 is disposed on the +Z side of the battery 13 and the first substrate 14 and disposed so as to cover the battery 13 and the first substrate 14. A circular opening section 15a is formed in a central part of the bottom cover 15. Part of the surface 13a on the +Z side of the battery 13 is exposed in the opening section 15a.

The vibration unit 16 has a stationary element 16a, a moving element 16b, and a driving source 16c. The stationary element 16a is formed in a cylindrical shape and houses the moving element 16b and the driving source 16c. The stationary element 16a is disposed within the opening section 15a of the bottom cover 15.

The moving element 16b is provided so as to be movable in the Z-axis direction. The driving source 16c is connected to the moving element 16b and moves the moving element 16b in the Z-axis direction. As the driving source 16c, a voice coil motor is used.

The operation of the driving source is performed by the control circuit 14a provided in the first substrate 14 described above. The vibration unit 16 has a configuration in which the driving source 16c reciprocates the moving element 16b in the Z-axis direction and thereby the moving element 16b is vibrated in the Z-axis direction.

The control circuit 14a is capable of adjusting a frequency of reciprocation of the moving element 16b at any time. By adjusting the frequency of reciprocation of the moving element 16b, the frequency of vibration generated in the vibration unit 16 can be set to a desired value. For example, in the vibration unit 16, the frequency of vibration can be set to 90 Hz to 120 Hz.

The movable unit 102 has a housing 26. The housing 26 is formed so as to cover part of a surface on the +Z side of the body unit 101. The housing 26 is connected to the moving element 16b of the vibration unit 16. Accordingly, the housing 26 is provided to be movable in the Z-axis direction integrally with the moving element 16b.

The moving element 16b vibrates in the Z-axis direction. Thereby, vibration of the moving element 16b is transmitted to the housing 26, and the housing 26 vibrates in the Z-axis direction.

The plurality of resonators 103 are disposed on a surface 15b on the +Z side of the bottom cover 15. The plurality of resonators 103 are configured such that each resonator resonates with vibration having a predetermined frequency. Each of the plurality of resonators 103 is sandwiched by the bottom cover 15 and the transmission unit 104 in the Z-axis direction. The transmission unit 104 transmits vibration of the vibration unit 16 to the plurality of resonators 103.

Figure 3:
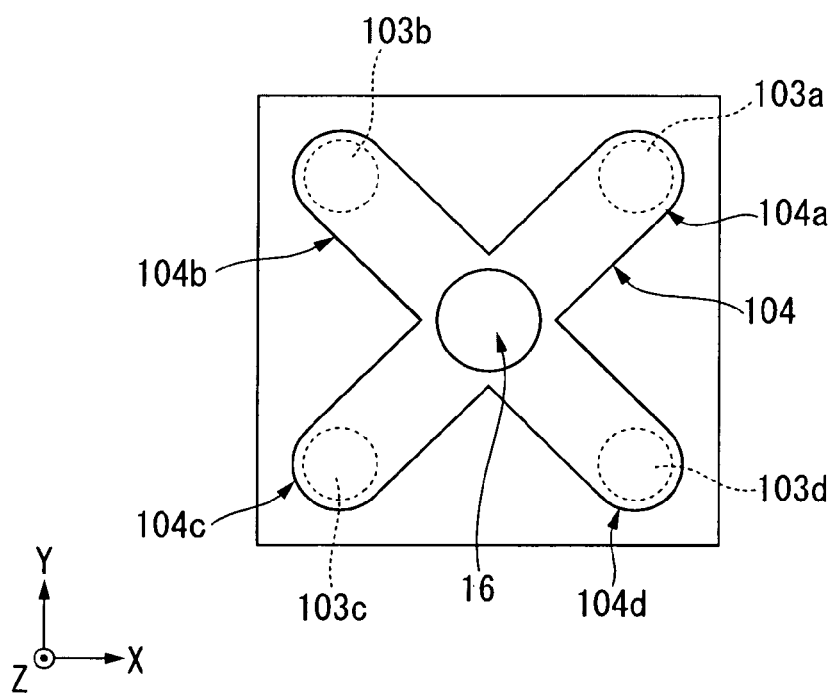
FIG. 3 is a plan view showing a configuration of part of the electronic apparatus according to the present embodiment.

FIG. 3 is a plan view showing a configuration when the electronic apparatus 100 is looked at from the +Z side. In FIG. 3, in order to make the plurality of resonators 103 and the transmission unit 104 easily understood, the housing 26 is omitted.

As shown in FIG. 3, one of the resonators 103 is disposed on each of four corner portions of the body unit 101 in a plan view. The vibration unit 16 is disposed at a center of gravity position of the body unit 101 in a plan view, that is, a central part of the body unit 101.

The transmission unit 104 is formed in a cross shape in a plan view. One of the plurality of resonators 103 is connected to each of four end portions 104a to 104d of the transmission unit 104 (resonator 103a to resonator 103d). The resonators 103a to 103d are disposed so as to be the same distance away from the vibration unit 16.

The resonators 103a to 103d are each set so as to have a different resonating frequency. The resonators 103a to 103d each have one of resonance frequencies that are different each other.

For example, a resonance frequency of the resonator 103a is set to 90 Hz, a resonance frequency of the resonator 103b is set to 100 Hz, a resonance frequency of the resonator 103c is set to 110 Hz, and a resonance frequency of the resonator 103d is set to 120 Hz.

Figure 4:
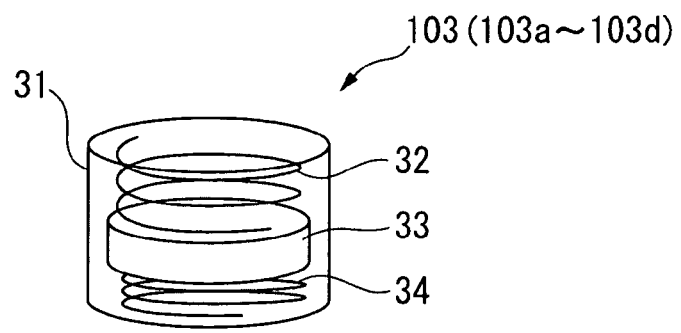
FIG. 4 is a perspective view showing a configuration of a resonator according to the present embodiment.

FIG. 4 is a perspective view showing a configuration of one resonator 103.

As shown in FIG. 4, the resonator 103 (103a to 103d) has a container 31, a first spring member 32, a weight 33, and a second spring member 34. In each of the resonators 103a to 103d, a spring constant of the first spring member 32 and the second spring member 34 or a mass of the weight 33 is set such that the resonance frequency becomes the above frequency.

Figure 5:
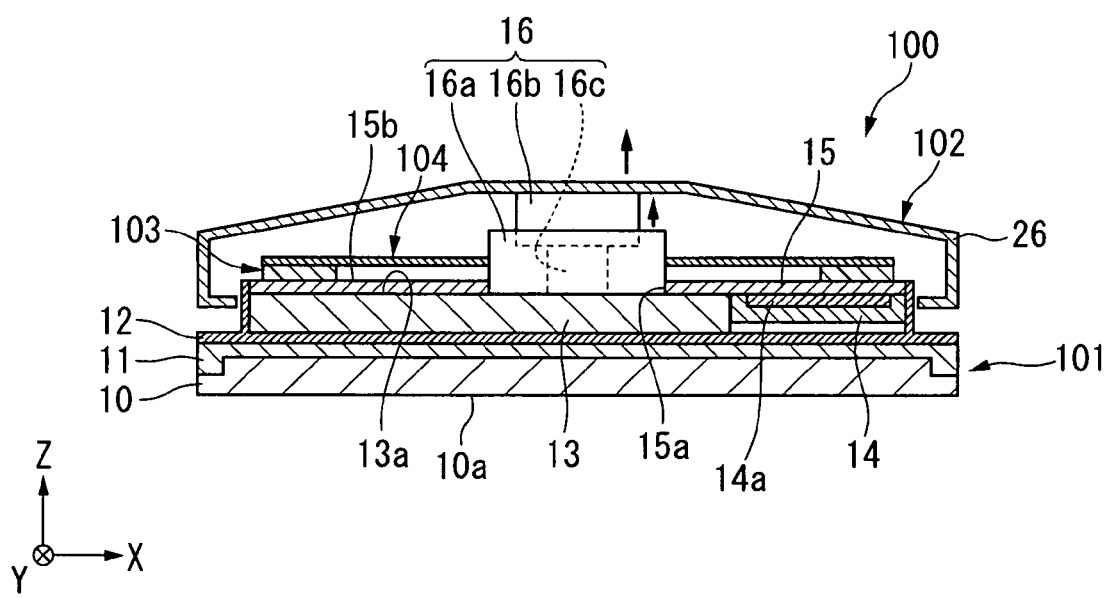
FIG. 5 is a view showing a state of operation of the electronic apparatus according to the present embodiment.

In this configuration, for example, when the moving element 16b moves in the +Z direction from a state shown in FIG. 2, as shown in FIG. 5, the housing 26 moves in the +Z direction in accordance with the movement of the moving element 16b.

Accordingly, a space between the body unit 101 and the movable unit 102 is extended, and a relative movement between the body unit 101 and the movable unit 102 is performed.

In addition, when the moving element 16b moves in the -Z direction from a state shown in FIG. 5 and returns to the state shown in FIG. 2, the housing 26 moves in the -Z direction in accordance with the movement of the moving element 16b. In this case also, a relative movement between the body unit 101 and the movable unit 102 is performed. In such a way, by the movement (vibration) of the moving element 16b, the movable unit 102 vibrates relative to the body unit 101.

When the moving element 16b moves, vibration which is generated in the vibration unit 16 by this movement is transmitted to each of the resonators 103a to 103d via the stationary element 16a and the transmission unit 104.

When the frequency of vibration of the vibration unit 16 is 90 Hz, the resonator 103a having a resonance frequency of 90 Hz resonates. Note that, at this time, other resonators 103b to 103d do not resonate. Therefore, in one of the four corner portions of the body unit 101 on which the resonator 103a is disposed, vibration is locally generated.

In addition, when the frequency of vibration of the vibration unit 16 is 100 Hz, the resonator 103b having a resonance frequency of 100 Hz resonates. Note that, other resonators 103a, 103c, and 103d do not resonate. Therefore, in one of the four corner portions of the body unit 101 on which the resonator 103b is disposed, vibration is locally generated.

Similarly, when the frequency of vibration of the vibration unit 16 is 110 Hz, the resonator 103c having a resonance frequency of 110 Hz resonates. Note that, other resonators 103a, 103b, and 103d do not resonate. Therefore, in one of the four corner portions of the body unit 101 on which the resonator 103c is disposed, vibration is locally generated.

Similarly, when the frequency of vibration of the vibration unit 16 is 120 Hz, the resonator 103d having a resonance frequency of 120 Hz resonates. Note that, other resonators 103a to 103c do not resonate. Therefore, in one of the four corner portions of the body unit 101 on which the resonator 103d is disposed, vibration is locally generated.

Moreover, by changing the frequency of vibration of the vibration unit 16 periodically, for example, as 90 Hz, 100 Hz, 110 Hz, and 120 Hz, a portion of the body unit 101 where vibration is locally generated can be moved in a counterclockwise direction. By appropriately combining the amplitude and the order of the frequency, it is possible to move the portion where vibration is locally generated to a desired position.

As described above, according to the present embodiment, the electronic apparatus includes: the body unit 101 that houses the control circuit 14a; the vibration unit 16 that is provided in the body unit 101, vibrates in a predetermined direction, and has a variable frequency of vibration; the plurality of resonators 103 that are each provided in a different portion of the body unit 101 and each resonate with vibration having a different frequency; and the transmission unit 104 that transmits vibration of the vibration unit 16 to the plurality of resonators 103.

Thus, by making vibration which is generated in the vibration unit 16 adapted to the resonance frequency of each of the resonators 103, each of the resonators 103 can be resonated individually, and it is possible to locally generate vibration in the body unit 101. Thereby, it is possible to reproduce a broad range of vibration states.

The technical range of the invention is not limited to the above embodiment, and changes can be appropriately added without departing from the scope of the invention.

For example, in the above embodiment, a configuration in which the vibration unit 16 is connected to a central part of the transmission unit 104 in a plan view has been described as an example; however, the configuration is not limited thereto. For example, the vibration unit 16 may be connected to a position away from the central part of the transmission unit 104. This can reproduce a further broad range of vibration states.

In addition, in the above embodiment, a configuration in which one of the plurality of resonators 103 is disposed at each of the places positioned at the same distance from the vibration unit 16 has been described as an example; however, the configuration is not limited thereto. For example, the plurality of resonators 103 may be disposed such that each resonator is a different distance away from the vibration unit 16. In addition, part of the plurality of resonators 103 may be disposed so as to have the same distance from the vibration unit 16.

In addition, in the above embodiment, a configuration in which the transmission unit 104 is formed in a cross shape in a plan view has been described as an example; however, the configuration is not limited thereto. For example, a configuration may be adopted in which the transmission unit 104 has a circular form, a polygonal shape such as a triangle or a quadrangle, or other planar shapes in a plan view.

In addition, in the above embodiment, a configuration in which the body unit 101 is formed in a rectangular shape in a plan view has been described as an example; however, the configuration is not limited thereto. For example, a configuration in which the body unit 101 is formed in a circular shape in a plan view or a configuration in which the body unit 101 has other planar shapes such as a triangle or a cross may be adopted.

In addition, in the above embodiment, a configuration in which one of the plurality of resonators 103a to 103d is disposed on each of the four corner portions of the body unit 101 has been described as an example; however, the configuration is not limited thereto. For example, a configuration may be adopted in which each of the four corner portions has two or more of the plurality of resonators disposed thereon. In addition, the position of the resonators 103 is not limited to the corner portion of the body unit 101. The resonators 103 may be provided on other regions.

In addition, the invention can be also applied to a configuration in which the movable unit 102 is not provided in the electronic apparatus 100.

The invention claimed is:

1. An electronic apparatus comprising:
    a body unit that houses an electronic circuit;
    a vibration unit that is positioned in the body unit, is configured to vibrate in a predetermined direction, and has a variable frequency of vibration;
    a plurality of resonators that are each positioned in a different portion of the body unit and are each set to resonate with vibration having a different frequency adjusted by a controller; and
    a transmission unit that is configured to transmit vibration of the vibration unit to the plurality of resonators and is controlled by the controller.

2. The electronic apparatus according to claim 1, further comprising:
    a movable unit that is connected to the body unit via the vibration unit and is configured to vibrate relative to the body unit by vibration of the vibration unit.

3. The electronic apparatus according to claim 1, wherein the body unit is formed in a shape having a corner portion in a plan view, and
    the plurality of resonators are provided in the corner portion of the body unit.

4. The electronic apparatus according to claim 1, wherein the body unit is formed in a rectangular shape in a plan view, and
    one of the plurality of resonators is provided on each of four corner portions of the body unit.

5. The electronic apparatus according to claim 1, wherein the vibration unit is disposed at a center of gravity position of the body unit in a plan view.

6. The electronic apparatus according to claim 1, wherein the transmission unit is formed in a cross shape in a plan view, and
    one of the plurality of resonators is connected to each of four end portions of the transmission unit.

7. The electronic apparatus according to claim 6, wherein the vibration unit is connected to a central part of the transmission unit in a plan view, and
    one of the plurality of resonators is disposed at each of places positioned at a same distance from the vibration unit.

8. The electronic apparatus according to claim 1, wherein the vibration unit is positioned at a center of the body unit.

* * * * *